US007788077B2

(12) United States Patent
Meng

(10) Patent No.: US 7,788,077 B2
(45) Date of Patent: Aug. 31, 2010

(54) METHOD FOR DETERMINING A SKY VIEW OF AN ANTENNA

(75) Inventor: Ming Meng, Novi, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 645 days.

(21) Appl. No.: 11/775,543

(22) Filed: Jul. 10, 2007

(65) Prior Publication Data

US 2009/0018810 A1 Jan. 15, 2009

(51) Int. Cl.
*G06F 17/50* (2006.01)

(52) U.S. Cl. ........ 703/13

(58) Field of Classification Search ........ 703/13
See application file for complete search history.

(56) References Cited

U.S. PATENT DOCUMENTS 6,317,599 B1 11/2001 Rappaport et al.
6,446,031 B1 9/2002 Welch
6,631,266 B1 10/2003 Lee et al.
6,721,769 B1 4/2004 Rappaport et al.
6,744,406 B2 6/2004 Kalafut et al.
7,055,107 B1 5/2006 Rappaport et al.
7,096,173 B1 8/2006 Rappaport et al.
7,155,228 B2 12/2006 Rappaport et al.
2004/0181374 A1 9/2004 Rappaport et al.
2006/0019679 A1 1/2006 Rappaport et al.
2006/0070113 A1 3/2006 Bhagwat et al.

OTHER PUBLICATIONS

B.T. Perry et al., "Simulation of a FM band self-structuring antenna in an automobile environment", 2003, Proceedings of the International Union for Radio Science Meeting 2003, pp. 1-28.*
Yong-Cheol Suh, "Automatic delineation of sky view in urban canyons by 3-dimensional GIS", Mar. 2004, KSCE Journal of Civil Engineering, vol. 8, No. 2, pp. 227-232.*
Lea Cristina Lucas de Souza et al., "A 3D-GIS extension for sky view factors assessment in urban environment", 2003, International Conference on Computers in Urban Planning and Urban Management 2003, pp. 1-13.*

* cited by examiner

*Primary Examiner*—Paul L Rodriguez
*Assistant Examiner*—Russ Guill
(74) *Attorney, Agent, or Firm*—Gifford, Krass, Sprinkle, Anderson & Citkowski, P.C.

(57) ABSTRACT

A method for determining the amount of open sky view of an antenna in an automotive vehicle. A computer simulation of the vehicle objects that are non-transmissive to electromagnetic radiation is first created while a simulated antenna is also positioned within the computer simulation. Thereafter, a plurality of spheres, each having a different radius, are simulated between a position adjacent the antenna and to a position outside the vehicle. All of the vehicle objects are identified for each sphere and the area saved to memory. Finally, the area of each object is projected onto an outer sphere and these projected areas are then summed. The sky view is then calculated by comparing the amount of the projected area on the outermost sphere and the sky view result is then displayed to the user.

5 Claims, 3 Drawing Sheets

METHOD FOR DETERMINING A SKY VIEW OF AN ANTENNA

BACKGROUND OF THE INVENTION

I. Field of the Invention

The present invention provides a method for determining the amount of open sky view of an antenna in an automotive vehicle.

II. Description of Material Art

Satellite radio receivers as well as GPS receivers are becoming increasingly popular for use with automotive vehicles. Satellite radio as well as GPS radio signals are transmitted from their respective satellite at very high frequencies, i.e. frequencies in excess of 1 gigahertz. Such high frequency radio waves are received only on a line of sight basis so that an obstruction which is non-transmissive of electromagnetic waves, e.g. metal objects, between the transmitter and the receiver will preclude reception of the radio transmission by the receiver.

Consequently, in order to ensure clear radio reception as well as reception from the number of GPS satellites necessary to render the GPS system operational, it is desirable that the antenna for the satellite radio and GPS system have as much as an open sky view as is possible.

One method of maximizing the amount of open sky view for the automotive vehicle is to place the automotive antenna on the car top. This solution, however, is not wholly desirable in that it exposes the antenna to the environment which can damage the antenna and also to vehicle washing equipment which can also damage the antenna. Indeed, in extreme cases, the attachment between the antenna and the vehicle roof or back deck may become damaged and result in water seepage into the passenger compartment. Additionally, many customers object to the appearance of a roof mounted antenna and prefer a hidden antenna.

In order to avoid the problems associated with roof-mounted antennas, many vehicles mount the antenna for satellite radio and GPS radio transmissions under or on the vehicle instrument panel so that the antenna is at least partially open to the sky through the vehicle windshield. However, by placing the antenna on the inside of the vehicle, there are certain objects positioned in between the antenna and the satellite that are constructed of materials that are non-transmissive to electromagnetic radiation, e.g. metal objects. Such objects include, for example, the vehicle front pillars, portions of the rearview mirror, etc.

Consequently, in order to determine the amount of open sky view for the antenna, it has been previously necessary to create a computer simulation of the objects of the vehicle that are non-transmissive to electromagnetic radiation. Thereafter, a number of sections are taken through the simulation and the area obscured by these non-transmissive objects determined for the various sections and then subsequently summed to a total. That total is then compared with the total sky area to determine the percentage of the sky view that is open to the antenna. If the amount of open sky view is less than a designated amount, e.g. 83%, the position of the antenna is moved and the above process is repeated.

A primary disadvantage of these previously known methods to determine the amount of open sky view is disadvantageously time consuming and tedious. Furthermore, since the amount of open sky view is determined manually, the process was subject to potential human error.

SUMMARY OF THE PRESENT INVENTION

The present invention provides a method for determining the amount of open sky view of an antenna for an automotive vehicle which overcomes the above-mentioned disadvantages of the previously known methods.

In brief, a computer simulation of objects of at least a portion of the automotive vehicle which are non-transmissive to electromagnetic radiation is created. Such objects typically comprise the metal objects for the vehicle such as the front vehicle pillars, portions of the rearview mirror and the like. A simulated antenna is then positioned at the desired mounting location in the computer simulation.

Thereafter, a plurality of spheres are formed between a small sphere positioned immediately adjacent and around the antenna and an outermost sphere positioned outside the automotive vehicle. For each generated sphere, all of the non-transmissive objects, if any, that are intersected by the sphere are identified as well as the area of each such detected object at the sphere radius. The area of that object is then saved only if the determined area for that object is greater than a previously determined area for that particular object.

Thereafter, the area of each object is projected onto the outermost sphere and the area of that projection is then determined. The projected areas for all detected objects are then summed together into a total area which represents the total amount of area on the outermost sphere that is obscured by objects in the vehicle non-transmissive to electromagnetic radiation. That total area is then compared with the total area of the sphere to determine the amount of the open sky view for the antenna and that end result is then displayed to the user.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
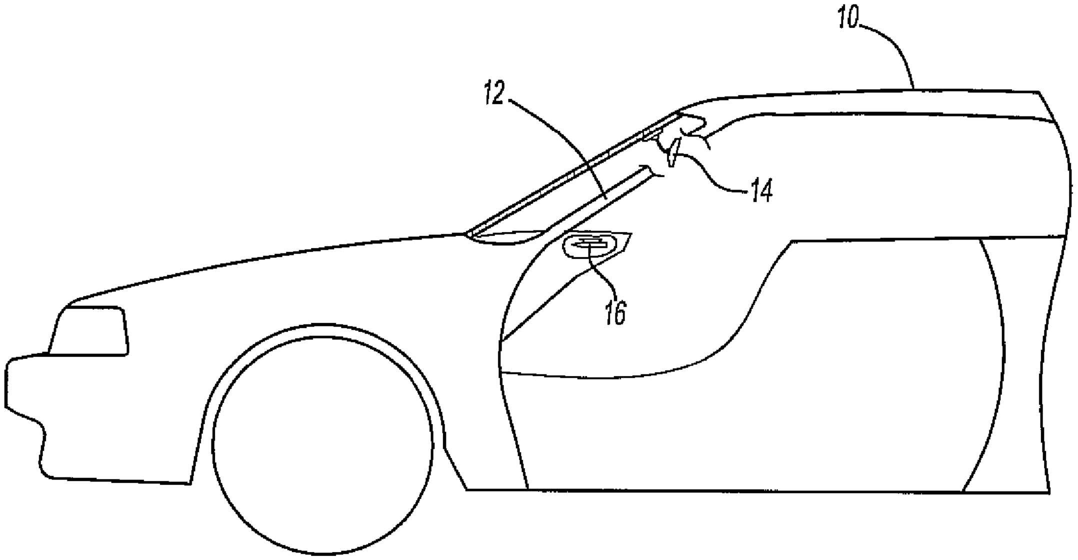
FIG. 1 is a fragmentary diagrammatic side view illustrating an antenna mounted under the instrument panel in an automotive vehicle.
Figure 2:
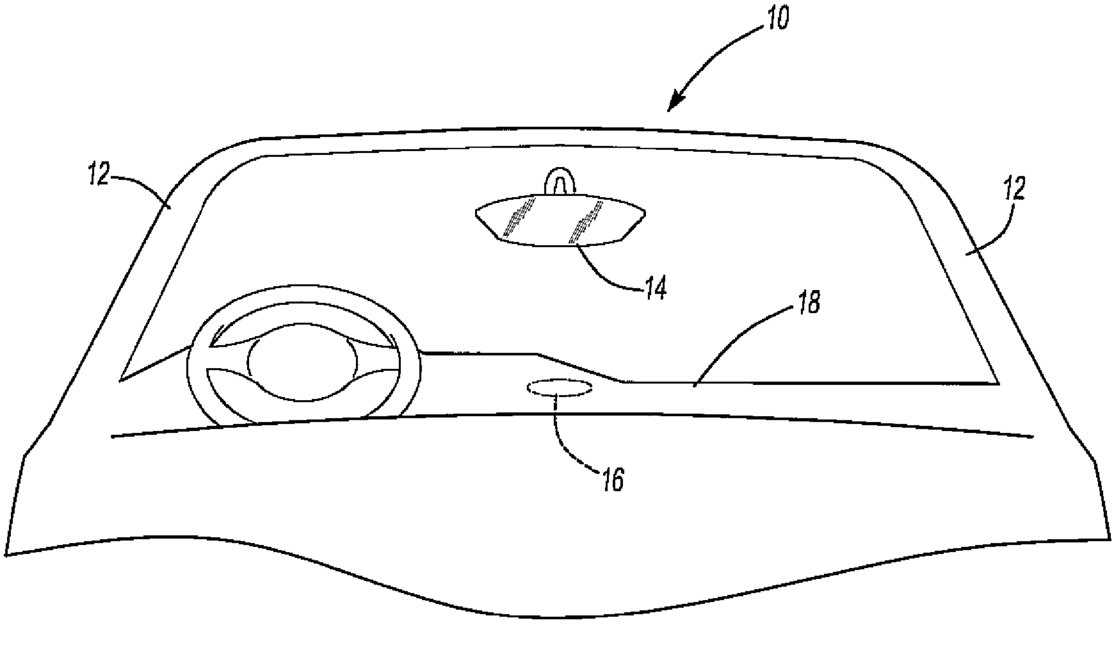
FIG. 2 is a fragmentary diagrammatic view of an automotive vehicle facing forward from inside the passenger compartment.

With reference first to FIGS. 1 and 2, a portion of an automotive vehicle 10 is there shown in diagrammatic form. The automotive vehicle 10 includes a plurality of objects which are non-transmissive to electromagnetic radiation. Such objects include, for example, the front pillars 12 and portions of a rearview mirror 14. The pillars 12 and rearview mirror 14 are by way of example only since the automotive vehicle 10 includes many other components which are non-transmissive or opaque to electromagnetic radiation of the type transmitted by satellite radio and GPS transmitters.

In order to receive the transmissions from the satellite radio and/or GPS transmitter, an antenna 16 is positioned on or below an instrument panel 18 so that the antenna 16 is open to the sky through the windshield (not shown). In determining the amount of sky view open to the antenna 16 it is only necessary to subtract the sky view obscured by the objects that are non-transmissive of electromagnetic waves, such as the pillars 12 and rearview mirror 14.

Figure 3:
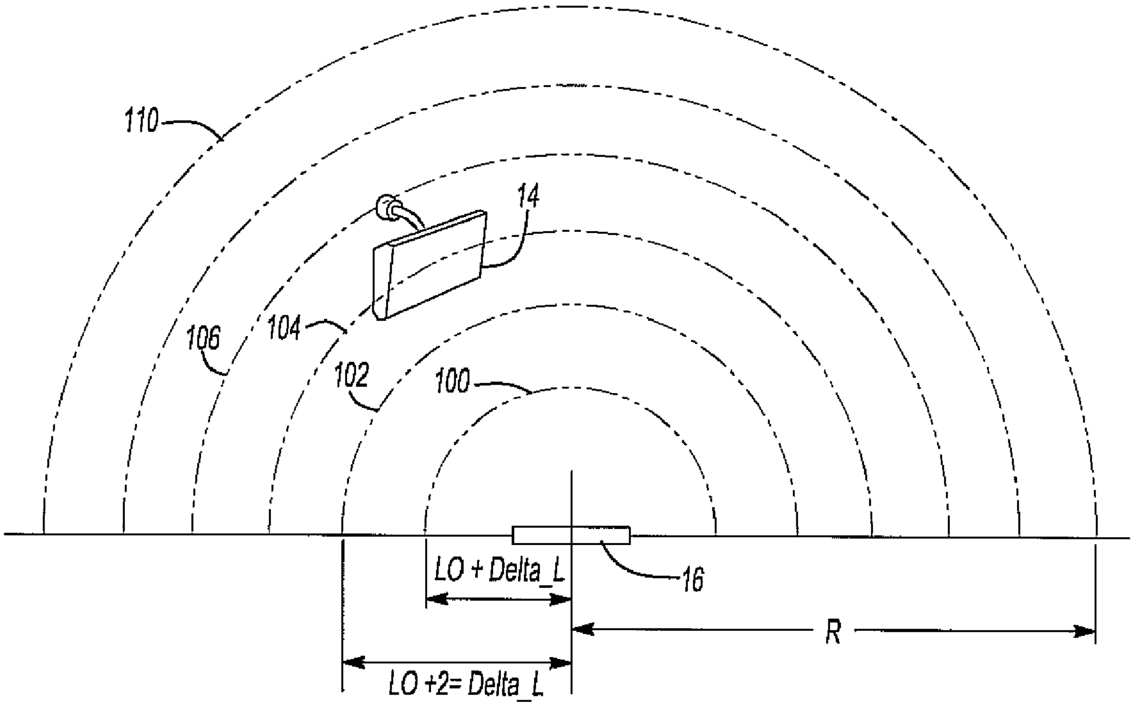
FIG. 3 is a view diagrammatically illustrating one portion of the method of the present invention.
Figure 5:
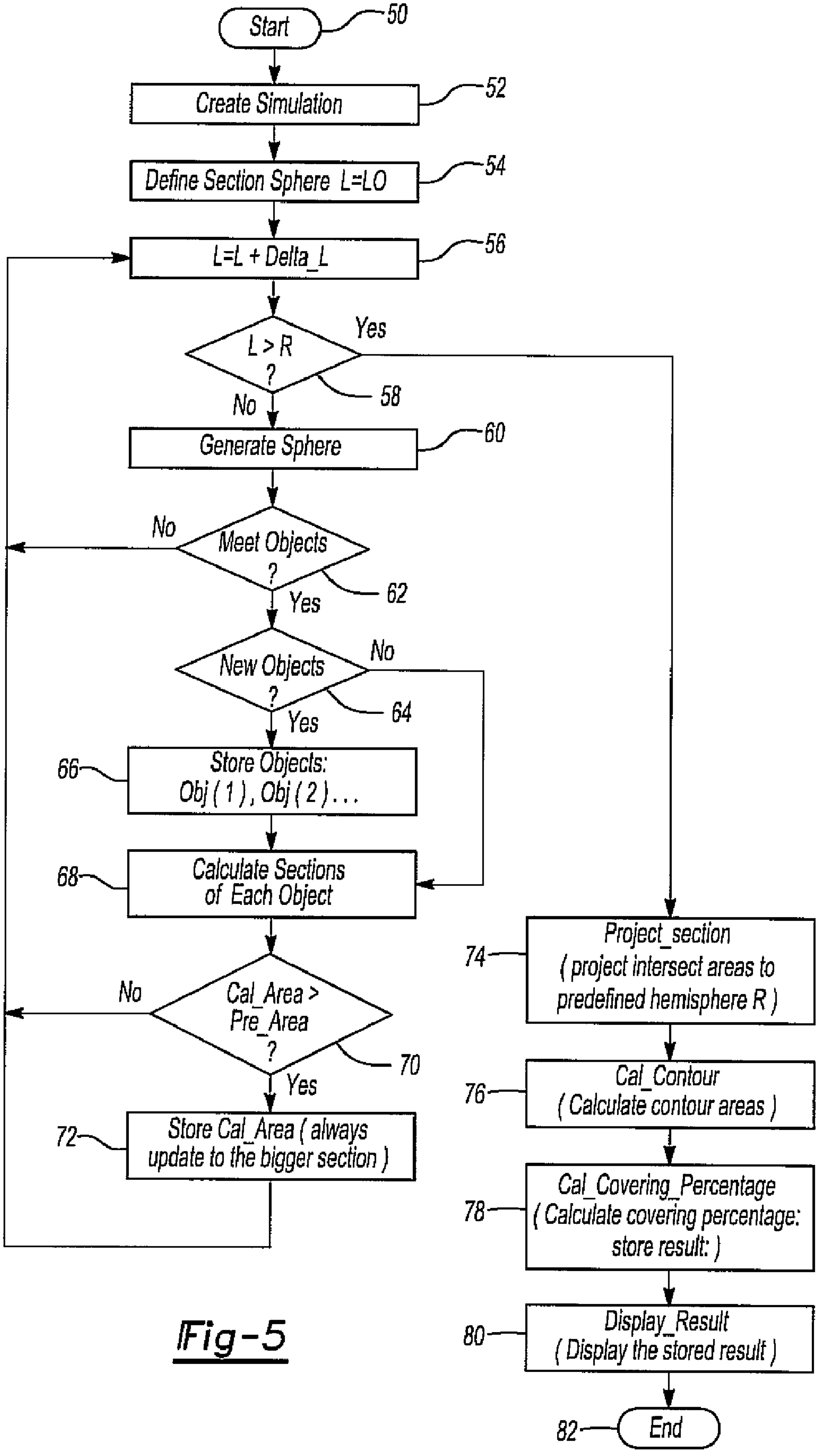
FIG. 5 is a flowchart illustrating an embodiment of the method of the present invention.

With reference now to FIGS. 3 and 5, FIG. 5 illustrates a flowchart of a preferred method of the present invention. After the program is initiated at step 50, step 50 proceeds to step 52 where a computer simulation of all objects of at least a portion of the automotive vehicle which are non-transmissive to electromagnetic radiation is created. Thus, the simulation created at step 52 will include all of the metal parts in the area of interest on the automotive vehicle, namely, the portion of the automotive vehicle around the instrument panel for the automotive vehicle is created. Step 52 then proceeds to step 54.

At step 54, the radius L of a sphere used to create the sections through the vehicle simulation is first set to $L_0$ and step 54 then proceeds to step 56 where this radius L is incremented by the increment Delta_L. Step 56 then proceeds to step 58. At step 58, the radius L of the current sphere is compared against a preset maximum radius R (FIG. 3) which represents a sphere or partial sphere which is positioned wholly outside the vehicle. Since the initial radius $L_0+\Delta\_L$ is less than R, step 58 proceeds to step 60.

At step 60, a first sphere 100 is simulated at a radius $L_0$+Delta_L. This first sphere, or partial sphere, 100 is positioned closely adjacent but outside the antenna 16. Step 60 then proceeds to step 62.

At step 62, the program determines whether or not the simulated sphere or partial sphere 100 has intersected or detected any objects. Since the sphere 100 has not intersected any objects, step 62 branches back to step 56 where the radius is incremented by Delta_L. Step 56 then proceeds through step 58 to step 60 where a second sphere 102 is simulated. As before, the sphere 102 does not encounter any of the objects that are opaque to electromagnetic radiation so that step 62 branches back to step 56 where the sphere radius L is again incremented by Delta_L. Step 56 then proceeds through step 58 to step 60 where a third sphere 104 is simulated. Unlike the spheres 100 and 102, however, the sphere 104 intersects the rearview mirror 14. Therefore, unlike the previously known spheres 100 and 102, step 62 instead branches to step 64.

At step 64, the program determines whether or not the object 14 is a newly encountered object or an object that has been previously encountered. In this case, the object 14 is a new object so that step 64 proceeds to step 66 where the new object Obj[1] . . . Obj[n] is stored in memory and step 66 then proceeds to step 68.

At step 68, the program determines the area of the encountered object, e.g. the rearview mirror 14, and then proceeds to step 70. At step 70, the program compares the area of the object calculated at step 68 with a previously calculated area for that same object. If the calculated area exceeds the previously stored area for each object, step 70 proceeds to step 72 where the newly calculated area for the object is stored in memory and step 72 then proceeds back to step 56 where the above process is repeated. Conversely, if the calculated area is less than the previously stored area for each object, step 70 instead proceeds back to step 56 where the above process is reiterated. In this case, since the object 14 has not been previously encountered, the previously stored area for the object 14 is zero so that step 70 branches to step 72 and stores the calculated area for the object 14 in memory and then proceeds back to step 56.

At step 56, the radius of the sphere is again incremented by Delta_L and 56 proceeds through step 58 to step 60 where a fourth sphere 106 is simulated. This fourth sphere 106, furthermore, also intersects a portion of the rearview mirror 14. Consequently, step 62 proceeds to step 64.

At step 64, the program determines if the object is a new object or a previously encountered object. In this example, the object or rearview mirror 14, has been previously encountered so that step 64 branches directly to step 68 where the section of the object 14 intersected by the sphere 106 is calculated. Step 68 then proceeds to step 70.

At step 70, the program again calculates the area of the object 14 intersected by the sphere 106. In this case, however, the area of the object 14 intersected by the sphere 106 is less than the previously stored area for the object 14. Consequently, step 70 branches directly back to step 56 without saving the newly calculated area for the intersection of sphere 106 with the object 14.

Consequently, it can be seen that the program not only identifies objects intersected by the spheres 100-106, but also saves the maximum area of each intersected object that is opaque or non-transmissive to electromagnetic radiation. This process, furthermore, continues until it reaches the outermost sphere 110 with a radius R which is a radius sufficiently large to encompass the entire automotive vehicle. When this occurs, step 58 branches to step 74.

Figure 4:
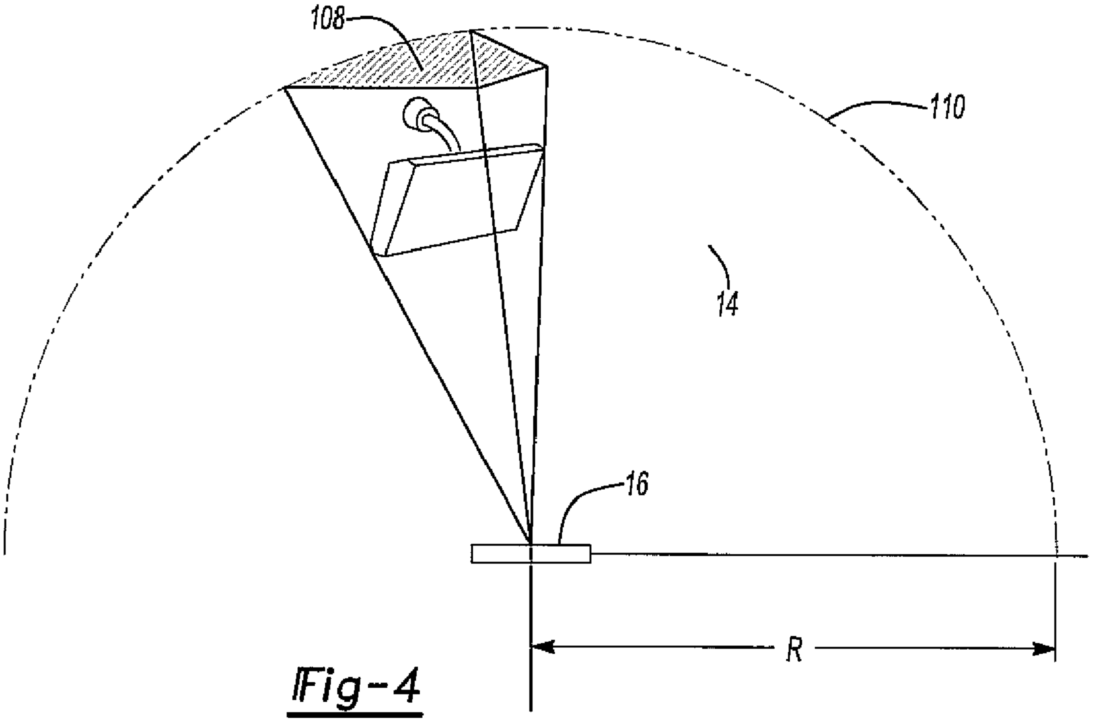
FIG. 4 is a diagrammatic view illustrating a further portion of the method of the present invention.

With reference now to FIGS. 4 and 5, at step 74 the program projects the area of each object 14 as viewed by the antenna 16 onto the sphere 110 outside the automotive vehicle, such as a sphere having the radius R. Step 74 then proceeds to step 76. At step 76, the amount of area 108 projected onto the outer radius sphere is then calculated for each object. Step 76 then proceeds to step 78.

At step 78, the program determines the amount of the area of the sphere which is covered by the projections 108 from the various objects 12, 14, etc. Step 78 then proceeds to step 80 where that result is displayed to the user by a printer, video screen, etc. and the program ends at step 82. If the unobstructed sky view for the antenna is greater than the desired amount, e.g. 83%, the antenna 16 will perform adequately in actual operation. If not, the antenna 16 may be moved to a new simulated area and the above process repeated until an acceptable antenna placement is achieved.

From the foregoing, it can be seen that the present invention provides a simple and yet effective automatic system for determining the amount of open sky view for an antenna. Furthermore, although the present invention has been described as increasing the simulated spheres from the antenna and out to the outermost or largest radius sphere, this is not necessary to practice the present method. Rather, the various simulated spheres 100-106 may be incremented from the smallest diameter to the largest diameter, decremented from the largest diameter to the smallest diameter, or even intermixed with each other without deviation from the spirit or scope of the invention.

Having described my invention, however, many modifications thereto will become apparent to those skilled in the art to which it pertains without deviation from the spirit of the invention as defined by the scope of the appended claims.

I claim:

1. A method for determining the amount of unobstructed sky view of an antenna in an automotive vehicle comprising the steps of a) creating a computer simulation of objects of at least a portion of the automotive vehicle which are non-transmissive to electromagnetic radiation, b) positioning a simulated antenna in said computer simulation, c) setting a radius to an initial radius, d) simulating at least a portion of a test sphere at said radius from said antenna, e) detecting all objects, if any, within an outer periphery of said simulated portion of said test sphere, f) determining the area of each detected object, g) saving the area of each detected object only if the determined area for each object is greater than a previously determined area for each object, h) changing the radius by a predetermined amount, i) reiterating steps d)-h) until said radius reaches a preset length, j) thereafter projecting the area of each object onto at least a portion of a projection sphere at a predetermined radius from the simulated antenna, k) summing the projected area on said projection sphere for each object, k) calculating the amount of the summed area relative to the area of said portion of said sphere, and l) displaying the amount.

2. The invention as defined in claim 1 wherein said setting step comprises the step of setting the initial radius such that said test sphere is positioned outside and adjacent the antenna.

3. The invention as defined in claim 2 wherein said changing step comprises the step of incrementing the radius by a predetermined increment.

4. The invention as defined in claim 1 wherein the projection sphere is dimensioned such that the projection sphere wholly encloses all of said objects.

5. The invention as defined in claim 1 wherein said calculating step further comprises the step of calculating the ratio of the summed area divided by the area of the projection sphere.

* * * * *